(12) United States Patent
Pachet et al.

(10) Patent No.: US 11,341,184 B2
(45) Date of Patent: May 24, 2022

(54) USER CONSUMPTION BEHAVIOR ANALYSIS AND COMPOSER INTERFACE

(71) Applicant: Spotify AB, Stockholm (SE)

(72) Inventors: François Pachet, Paris (FR); Pierre Roy, Paris (FR)

(73) Assignee: Spotify AB, Stockholm (SE)

( * ) Notice: Subject to any disclaimer, the term of this patent is extended or adjusted under 35 U.S.C. 154(b) by 88 days.

(21) Appl. No.: 16/285,305

(22) Filed: Feb. 26, 2019

(65) Prior Publication Data
US 2020/0272659 A1    Aug. 27, 2020

(51) Int. Cl.
G06F 16/683    (2019.01)
G06F 17/18    (2006.01)
G06N 20/00    (2019.01)
G06F 3/16    (2006.01)
H04N 21/24    (2011.01)
G10L 19/16    (2013.01)

(52) U.S. Cl.
CPC ............ G06F 16/685 (2019.01); G06F 3/165 (2013.01); G06F 17/18 (2013.01); G06N 20/00 (2019.01); G10L 19/167 (2013.01); H04N 21/2407 (2013.01)

(58) Field of Classification Search
CPC ........ G06F 16/685; G06F 17/18; G06F 3/165; G06F 3/167; G06N 20/00; H04N 21/2407; H04N 21/251; H04N 21/25866; H04N 21/44222; H04N 21/4398; H04N 21/8113; H04N 21/854; H04N 21/4394; G10L 19/167
See application file for complete search history.

(56) References Cited

U.S. PATENT DOCUMENTS

| | | | | |
|---|---|---|---|---|
| 9,756,091 | B1* | 9/2017 | Davies | .................. H04L 65/403 |
| 2002/0194984 | A1* | 12/2002 | Pachet | .................. G10H 1/0025 84/609 |
| 2004/0125124 | A1* | 7/2004 | Kim | ........................ G06F 16/71 715/716 |
| 2006/0074649 | A1* | 4/2006 | Pachet | .................. G10H 1/0066 704/229 |
| 2008/0126937 | A1* | 5/2008 | Pachet | .................... G06F 3/017 715/720 |

(Continued)

OTHER PUBLICATIONS

Extended EP Search Report from corresponding Int'l Appl'n No. 20159383.7, dated May 13, 2020.

(Continued)

*Primary Examiner* — Tuyetlien T Tran
(74) *Attorney, Agent, or Firm* — Merchant & Gould P.C.

(57) ABSTRACT

A computing device comprising a display screen, the computing device being configured to decompose a media recording into a plurality of media recording salient events, apply each of the media recording salient events to a reinforcement model, display on the display screen (i) a mapping of the plurality of media recording salient events and (ii) for at least one of the plurality of media recording salient events, at least one selectable next best action, the computing device further configured to replace at least one of the plurality of media recording salient events with at least one selectable next best action to create a derivative media recording including at least one replacement media recording action.

27 Claims, 6 Drawing Sheets

(56) References Cited

U.S. PATENT DOCUMENTS

| | | | |
|---|---|---|---|
| 2008/0306807 A1* | 12/2008 | Amento | G06Q 30/0631 705/7.33 |
| 2014/0150004 A1* | 5/2014 | Vemparala | H04N 21/44222 725/13 |
| 2014/0195544 A1* | 7/2014 | Whitman | G06F 16/435 707/744 |
| 2014/0278969 A1* | 9/2014 | Newell | G06Q 30/0276 705/14.53 |
| 2014/0289241 A1 | 9/2014 | Anderson | |
| 2015/0326688 A1* | 11/2015 | Aarnio | G06F 16/683 707/748 |
| 2016/0216934 A1* | 7/2016 | Guy | G06F 3/165 |
| 2016/0247496 A1* | 8/2016 | Pachet | G10H 1/40 |
| 2018/0039951 A1* | 2/2018 | Wynn | H04N 7/15 |
| 2018/0082404 A1* | 3/2018 | Adsumilli | G06T 7/248 |
| 2018/0181593 A1* | 6/2018 | Ranzinger | G06F 16/5838 |
| 2018/0253491 A1* | 9/2018 | Moraleda | G06F 16/739 |
| 2018/0254064 A1* | 9/2018 | Gonzalez-Banos | G11B 27/031 |
| 2018/0255329 A1* | 9/2018 | Gonzalez-Banos | H04N 21/8456 |
| 2018/0270283 A1* | 9/2018 | Bostick | G06Q 10/10 |
| 2018/0341704 A1* | 11/2018 | Barkan | G06F 16/637 |
| 2018/0365309 A1* | 12/2018 | Oliner | G06Q 10/06393 |
| 2019/0076741 A1* | 3/2019 | Thompson | H04N 21/25891 |
| 2020/0128294 A1* | 4/2020 | Gupta | H04N 21/8456 |

OTHER PUBLICATIONS

Fiebrink et al., "The Machine Learning Algorithm as Creative Musical Tool", Oxford University Press (2016).

Bimbot, F. et al., "Methodology and conventions for the latent semiotic annotation of music structure," Report, PI-1993 (2012). Available at: http://musicdata.gforge.inria.fr/structureAnnotation.html.

Rabbat, P. and Pachet F., "Direct and Inverse Inference in Music Databases: How To Make a Song Funk?" ISMIR 2008—Session 5a—Content-Based Retrieval, Categorization and Similarity 2, pp. 589-594 (2008).

"Hooked on Music," MOSI-Hooked on Music (2014), available at: http://www.hookedonmusic.org.uk/.

Lamere, P., "The Skip," Music Machinery, 18 pages (May 2, 2014), available at: https://musicmachinery.com/2014/05/02/the-skip/.

Lamere, P., "Archive for category hacking: The Drop Machine," Music Machinery, 34 pages (Jun. 16, 2015), available at: https://musicmachinery.com/category/hacking/.

Korsmit, I. et al., "If You Wanna Be My Lover . . . A Hook Discovery Game to Uncover Individual Differences in Longterm Musical Memory," Proceedings of the 25th Anniv. Conf. of the European Soc. for the Cognitive Sci. of Music, Jul. 31-Aug. 4, 2017, Ghent, BE, pp. 106-111.

Sargent, G. et al., "Estimating the structural segmentation of popular music pieces under regularity constraints," IEEE/ACM Transactions on Audio, Speech, and Language Processing, IEEE, vol. 25 , Issue: 2 (Feb. 2017).

Van Buskirk, E., "Hear The Most 'Dramatic' Part of Any Song on Spotify," Spotify Insights, 3 pages (Sep. 26, 2014), available at: https://insights.spotify.com/US/2014/09/26/most-dramatic-part-of-any-song/.

Burgoyne, J. et al., "Hooked: A Game for Discovering What Makes Music Catchy," 14th Int'l Soc. for Music Info. Retrieval Conf., pp. 245-250 (2013).

"Semiotic Structure Annotation", available at: http://musicdata.gforge.inria.fr/structureAnnotation.html <accessed Aug. 27, 2019).

"Jensen-Shannon divergence," Wikipdeia, 6 pages (Jun. 19, 2019), available at: https://en.wikipedia.org/wiki/Jensen%E2%80%93Shannon_divergence.

"Kullback-Leibler divergence," Wikipedia, 14 pages (Aug. 13, 2019), available at: https://en.wikipedia.org/wiki/Kullback%E2%80%93Leibler_divergence.

O'Brien, T., "Musical Structure Segmentation With Convolutional Neural Networks," Center for Computer Research in Music and Acoustics (CCRMA), 9 pages (2016).

Bimbot, F., et al., "Semiotic Description of Music Structure : An Introduction to the Quaero/Metiss Structural Annotations", Proc. 53rd AES International Conference on Semantic Audio, London, 2014 (12 pages).

\* cited by examiner

USER CONSUMPTION BEHAVIOR ANALYSIS AND COMPOSER INTERFACE

TECHNICAL FIELD

Example aspects described herein relate generally relate to media content analysis, and more particularly to user consumption behavior tools.

BACKGROUND

Consumers of media recordings containing content, such as songs or other musical pieces, may be prompted to interact with the device playing the media recording for numerous reasons. For example, a user may stop listening to a certain media recording or a section of the media recording for numerous reasons, such as due to the quality of the sound in the media recording or otherwise related to the musical composition itself. For example, in extreme circumstances, where the data representing the media recording has become corrupted, the user will skip to the next media recording in the playlist, or choose an alternative media recording, in order to avoid listening to a corrupted media recording. Other reasons exist as to why a user will skip to the next media recording (or skip to another section of a media recording). Lacking is technology that summarizes such behavior, including a graphical user interface that presents such information efficiently and in a manner that allows creators (e.g., artists) to identify the causes of such behavior. Identifying these behaviors can be used to generate a new media recording that does not suffer from the defects that cause users to skip media recordings, and interact with the media playing device in other ways. Minimizing the number of user interactions with the media player is desirable because this leads to more efficient use of computing resources, such as battery power, memory and bandwidth.

Media recordings can take many forms for playback on a media playback device. For example, they can be multimedia in the form of digital files that can be obtained by downloading, a process in which the end-user saves the entire file for the music content onto the media playback device before playing it. Media recordings also can be multimedia that is streamed on-demand through a media playback device without being completely downloaded.

Whether the media recording is downloaded or streamed, applications and services can detect the various actions taken on the media playback device in connection with the media recording. Particularly, an interface of the media playback device receives input corresponding to such actions. For example, music playback applications include control functions (also referred to herein as playback actions or simply actions) such as rewind, forward, pause, stop, and skip. In addition to the stopping of playback of a media recording altogether, one way in which users stop listening is by skipping the remainder of it and moving on to another media recording (e.g., skipping one song to play another song). These playback actions can be automatically recorded in activity profiles that associate the playback actions to corresponding media recordings. Thus a playback action is an action a listener performs that effects the playback of a media content item on a media playback device.

Lamere, P. The Skip, Blog post available at https://musicmachinery.com/2014/05/02/the-skip (May 2014) describes analysis of skip behaviors including how to understand the listening behavior of listener across various categories age, sex, time of day, etc. While such analysis tools are helpful in understanding why people skip songs, they do not determine or summarize the probable underlying reason(s) that caused listeners to stop listening to some or all of the media recordings, much less provide recommendations for replacing elements of the media compositions contained therein (e.g., replacing a drum loop for a base guitar loop).

An element of the media composition is referred to as a media recording event. Media compositions contain plural media recording events. The most notable musical components of the media recording are referred to as media recording salient events. Lamere, P. "The Drop Machine", available at: https://musicmachinery.com/category/hacking/ (2015) and Eliot Van Buskirk, "Hear The Most 'Dramatic' Part of Any Song on Spotify", available at: https://insights.spotify.com/us/2014/09/26/most-dramatic-part-of-any-song/ (2014) describe studies regarding the identification of the most important part of a song referred to as a "drop", using so-called scrubbing behavior. In digital audio editing, scrubbing is an interaction in which a user drags a cursor or playhead across a segment of a waveform to hear it. Scrubbing is a way to quickly navigate an audio file. Other studies, such as Burgoyne, J. A., Balen, J. Van, Bountouridis, D., & Honing, H. (2013). Hooked: A game for discovering what makes music catchy. In Proceedings of the International Society for Music Information Retrieval (ISMIR), 245-250 describe the use crowdsourcing to identify most remembered parts of songs.

SUMMARY

The present disclosure relates to a computing device that determines a probability that a particular salient event (e.g., drums, singing, change in atmosphere, etc.) was the reason for an action (e.g., rewind, forward, pause, stop, skip, etc.) and by providing this information via an interface. The interface can supply the information in any one of plural forms that can be used by creators or other computing machines. One example interface is a user interface that can present the information via a display screen of a computing device such as a personal computer (PC).

Determining a probability that a particular salient event causes an action allows salient events that are likely to cause an action to be identified. Once identified, these salient events can be replaced with salient events that are less likely to cause the action, thus creating a derivative media record that is likely to cause the action. In this way, it is possible to reduce the number of times that users interact with the computing device by rewinding, forwarding, pausing, stopping, skipping etc. This reduces the amount of computing resources, such as processing power and energy, that are used at the computing device. In a specific example where a media recording is streamed to the computing device and data is buffered while the media recording is playing, by identifying salient events that are likely to skipped and by replacing these salient events with salient events that are less likely to be skipped, it is possible to avoid wasted bandwidth and storage usage by reducing the possibility of buffering data that will not be used.

In some example embodiments, a structural analysis is performed on the media recording to determine musical components of the content stored thereon. The musical components are then mapped in time such that peaks show a user performed an action indicating, for example, that they left a media recording (e.g., a skip). In some example embodiments, this is accomplished by recording the closest salient event that was playing just before a listener performed the action in response to the salient event. In some embodiments the closest salient events that were playing just before and after a listener performed the action in response to the salient event are recorded. In some embodiments, the mapping provides two sources of information for a particular point in time: at least one salient event (i.e., drums, singing, change in atmosphere, etc.) and a probability that a particular salient of the at least one salient event was the reason for a skip. The output can be represented using key-value pair (KVP), a set of two linked data items: a key, which is a unique identifier for some item of data, and the value, which is either the data that is identified or a pointer to the location of that data. The key-value pairs can represent, for example, time, probability, instrument, vocals (e.g., time: 35 seconds, probability: 0.1, guitar: 0.5, voice: 0.4).

In some embodiments, the display screen is further configured to overlay on the mapping the structural components of the composition stored on the media recording.

In some example embodiments, a structural analysis is performed on the media recording to determine musical components of the content stored thereon. The musical components of the media recording that are most notable, namely the media recoding salient events, are determined. The media recording salient events are mapped in time such that peaks show a user performed an action (i.e., caused a user to input a playback action via the interface of the media playback device) indicating, for example, that they left a media recording (e.g., a skip). In some example embodiments, this is accomplished by recording the closest media recording salient event that was playing just before a playback action was selected by a listener in response to the media recording salient event. In some embodiments the closest media recording salient events that were playing just before and after a listener performed the action in response to the media recording salient event are recorded. In some embodiments, the mapping provides two sources of information for a particular point in time: at least one media recording salient event (i.e., drums, singing, change in atmosphere, etc.) and a probability that a particular salient event of the at least one media recording salient event was the reason for the action (e.g., a skip). The output might look something like this, time: 35 seconds, probability: 0.1, guitar: 0.5, voice: 0.4). gcv mbodiments, the display screen is further configured to overlay on the mapping the structural components of the composition stored on the media recording.

In some embodiments, a processor provides media creation recommendations by determining the probability that a particular media recording salient event was the reason for a playback action (e.g., a skip) and supplying a replacement media recording action. This is accomplished by decomposing a media recording (e.g., a song-type media composition) as a sequence of media recording salient events (e.g., Phase 1: intro—(media recording salient event) guitar and (media recording salient event) drums (4 bars)—two media recording salient events; phase 2: (media recording salient event) voice, (media recording salient event) stop drums and (media recording salient event) change guitar—three salient event). A reinforcement model is trained using a corpus of tracks. The result of the training is a "policy" that provides a next best action that can be taken. A next best action is a event that can be taken instead of a salient event (e.g., drums, singing, change in atmosphere, etc.). In some embodiments plural selectable next best actions can be generated. A selected next best action (also referred to as a replacement media recording action) may or may not be a salient event. The trained model provides the next best action (e.g., "stop the voice"). In some embodiments, the processor provides a recommendation for a next best action. In some embodiments, the product is an application that will help create content taking the best possible action at each phase (i.e., step).

In some embodiments, there is provided a computing device comprising a display screen, the computing device being configured to display on the display screen a mapping of at least one salient event of a media recording to a corresponding probability value indicating a probability that the at least one salient event is a cause for an action associated with the media recording.

The computing device can further be configured to display on the display screen a time-axis indicating a time of an occurrence of the at least one salient event. The computing device can further be configured to display on the display screen a peak indicating a time at which a plurality of consumers of the media recording stopped listening to the media recording. In some embodiments, the peak corresponds to a media playback device receiving the action, the action being a command to skip playback of the media recording. In some embodiments the peak corresponds to a media playback device receiving a command to stop playback of the media recording. In some embodiments, the peak corresponds to a media playback device receiving a command to move a playback position forward or reverse to another position within the media recording.

In some embodiments, the action is at least one of a skip action, a stop action, a forward action, and a reverse action.

The computing device can further be configured to display on the display screen a plurality of structural components of the media recording.

In some embodiments, there is provided a computer-implemented method comprising: displaying on a display screen a mapping of at least one salient event of a media recording to a corresponding probability value indicating a probability that the at least one salient event is a cause for an action associated with the media recording.

In some embodiments, the computer-implemented method further comprises displaying on the display screen a time-axis indicating a time of an occurrence of the at least one salient event.

In some embodiments, the computer-implemented method further comprises displaying on the display screen a peak indicating a time at which a plurality of consumers of the media recording stopped listening to the media recording. In some embodiments, the peak corresponds to a media playback device receiving the action, the action being a command to skip playback of the media recording. In some embodiments, the peak corresponds to a media playback device receiving a command to stop playback of the media recording. In some embodiments, the peak corresponds to a media playback device receiving a command to move a playback position forward or reverse to another position within the media recording.

In some embodiments, the action is at least one of a skip action, a stop action, a forward action, and a reverse action.

In some embodiments, the computer-implemented method further comprises displaying on the display screen a plurality of structural components of the media recording.

In some example embodiments, there is provided a computing device comprising a display screen, the computing device being configured to decompose a media recording into a plurality of media recording salient events, apply each of the media recording salient events to a reinforcement model, display on the display screen (i) a mapping of the plurality of media recording salient events and (ii) for at least one of the plurality of media recording salient events, at least one selectable next best action, the computing device further configured to replace at least one of the plurality of media recording salient events with at least one selectable next best action to create a derivative media recording including at least one replacement media recording action.

In some embodiments, the computing device is further configured to display on the display screen a plurality of phases of the media recording, each phase including at least one of the media recording salient events.

In some embodiments, the computing device is further configured to determine, for each of the plurality of media recording salient events, a probability value indicating a probability that the media recording salient event is a cause for a playback action, and swap the at least one selectable next best action for the media recording salient event automatically.

In some embodiments, the computing device is further configured to determine, for each of the plurality of media recording salient events, a probability value indicating a probability that the media recording salient event is a cause for a playback action and swap the at least one selectable next best action for the media recording salient event automatically until the probability value is within a predetermined threshold.

In some example embodiments, the computing device further comprises a media playback component, the computing device further configured to cause the media playback component to playback the derivative media recording a predetermined time prior to the media recording salient event and to playback the media recording salient event and the at least one selectable next best action sequentially starting from the predetermined time.

In some embodiments, the computing device further comprises a media playback component, the computing device further configured to provide a visual indication of the at least one replacement action, the at least one replacement action being selectable, wherein when the at least one replacement action is selected, the media playback component plays back the derivative media recording from a predetermined time prior to a start of the replacement action.

In another embodiment, there is provided a computer-implemented method comprising: decomposing a media recording into a plurality of media recording salient events; applying each of the media recording salient events to a reinforcement model; displaying on a display screen:
  (i) a mapping of the plurality of media recording salient events, and
  (ii) for at least one of the plurality of media recording salient events, at least one selectable next best action; and
replacing at least one of the plurality of media recording salient events with at least one selectable next best action to create a derivative media recording including at least one replacement media recording action.

In some embodiments, the computer-implemented method further comprises displaying on the display screen a plurality of phases of the media recording, each phase including at least one of the media recording salient events.

In some embodiments, the computer-implemented method further comprises: determining, for each of the plurality of media recording salient events, a probability value indicating a probability that the media recording salient event is a cause for a playback action; and swapping the at least one selectable next best action for the media recording salient event automatically.

In some embodiments, the computer-implemented method further comprises: determining, for each of the plurality of media recording salient events, a probability value indicating a probability that the media recording salient event is a cause for a playback action; and swapping the at least one selectable next best action for the media recording salient event automatically until the probability value is within a predetermined threshold.

In some example embodiments, the computer-implemented method further comprises: causing a media playback component to playback the derivative media recording a predetermined time prior to the media recording salient event and to playback the media recording salient event and the at least one selectable next best action sequentially starting from the predetermined time.

In some example embodiments, the computer-implemented method further comprises: causing a media playback component to provide a visual indication of the at least one replacement action, the at least one replacement action being selectable, wherein when the at least one replacement action is selected, the media playback component plays back the derivative media recording from a predetermined time prior to a start of the replacement action.

In some embodiments, the playback action is at least one of a skip action, a stop action, a forward action, and a reverse action.

In another example embodiment, there is provided a non-transitory computer-readable medium comprising instructions which, when executed by a one or more processors, cause the one or more processors to carry out the methods described herein, including any one of the above-described methods.

In another example embodiment, there is provided a computer program comprising instructions which, when the program is executed by one or more processors, cause the one or more processors to carry out the methods described herein, including any one of the above-described methods.

In another example embodiment, there is provided a data carrier signal carrying the computer programs described herein, including the above-described programs.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for performing user consumption behavior analysis and related tools therefore, which are now described herein in terms of an example behavior analyzer server that analyzes listener consumption behavior associated with songs. This description is not intended to limit the application of the example embodiments presented herein. In fact, after reading the following description, it will be apparent to one skilled in the relevant art(s) how to implement the following example embodiments in alternative embodiments (e.g., involving consumption behavior systems for analyzing user consumption behavior of books, games, movies, videos, and the like). Also, in some embodiments, the listener behavior is described in terms of skip behavior. This description is not intended to limit the application of the example embodiments to only skip behavior. Other playback actions such as start, stop, forward and rewind can be detected and operated on in a similar manner.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Device Environment

Figure 1:
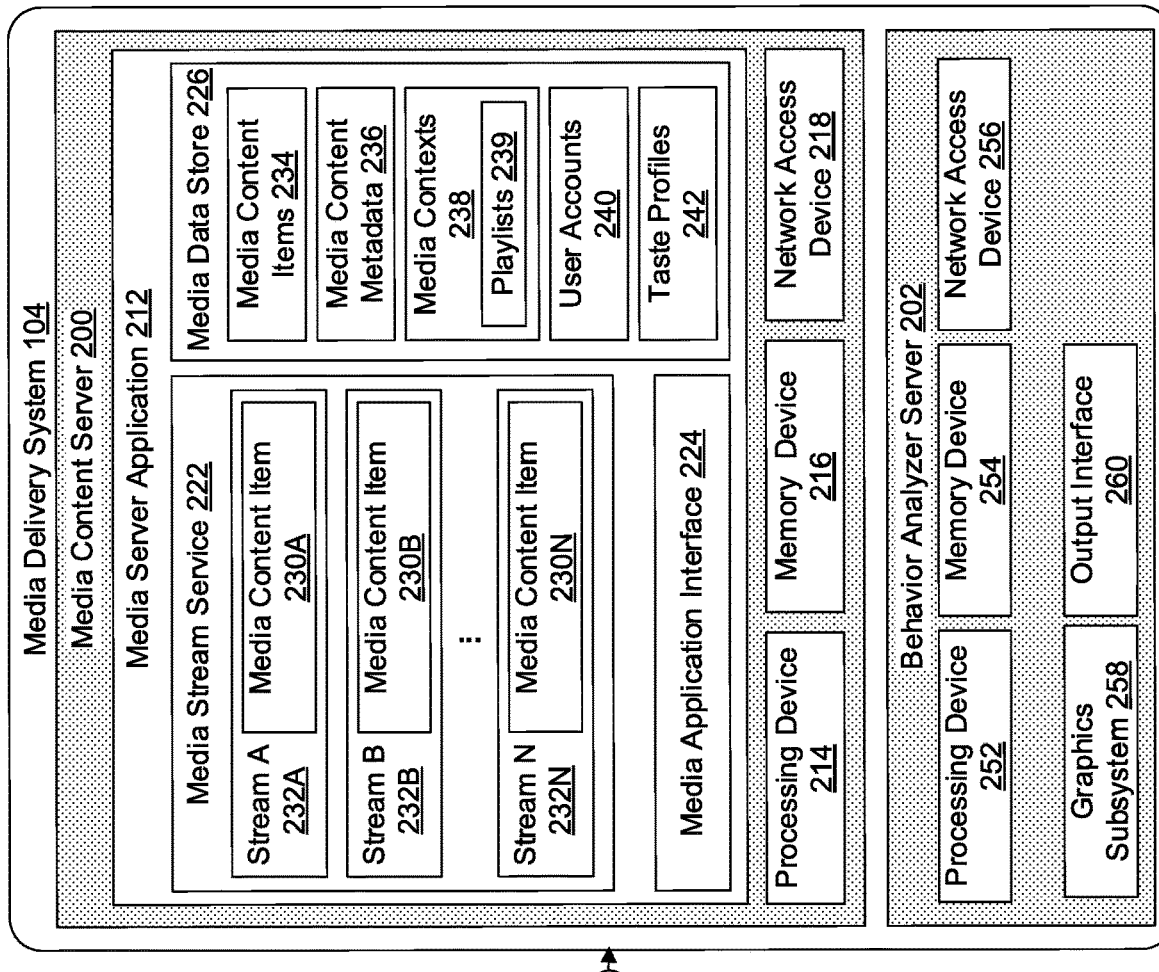
FIG. 1 is a block diagram of a media content provision system according to an example embodiment.
Figure 1:
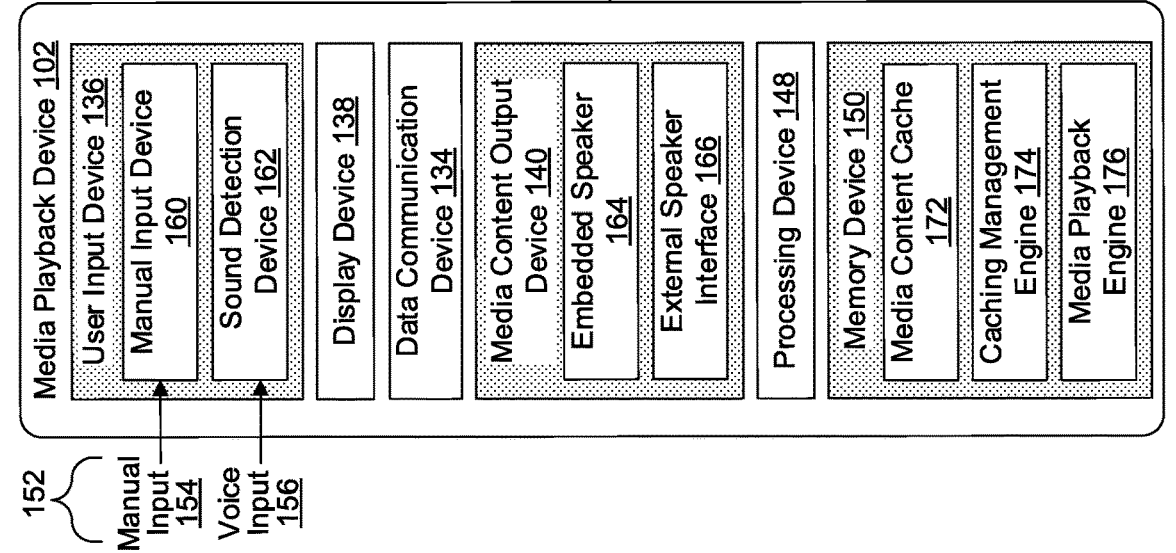

FIG. 1 is a block diagram of an example media content provision system 100 including a media playback device 102 and a media delivery system 104. In this example, media playback device 102 includes a user input device 136, a display device 138, a data communication device 134, a media content output device 140, a processing device 148, and a memory device 150.

The media playback device 102 operates to play media content. For example, the media playback device 102 is configured to play media content that is provided (e.g., streamed or transmitted) by a system external to the media playback device 102, such as the media delivery system 104, another system, or a peer device. In other examples, the media playback device 102 operates to play media content stored locally on the media playback device 102. In yet other examples, the media playback device 102 operates to play media content that is stored locally as well as media content provided by other systems. It should be understood that for simplicity FIG. 1 illustrates only one media playback device 102. However, it is envisioned that multiple media playback devices 102 are in use in system 100.

In some embodiments, the media playback device 102 is a handheld or portable entertainment device, smartphone, tablet, watch, wearable device, or any other type of computing device capable of playing media content. In other embodiments, the media playback device 102 is a laptop computer, desktop computer, television, gaming console, set-top box, network appliance, blue-ray or DVD player, media player, stereo, or radio.

In some embodiments, the media playback device 102 is a system dedicated for streaming personalized media content in a vehicle environment.

The user input device 136 operates to receive a user input 152 for controlling the media playback device 102. As illustrated, the user input 152 can include a manual input 154 and a voice input 156. In some embodiments, the user input device 136 includes a manual input device 160 and a sound detection device 162.

The manual input device 160 operates to receive the manual input 154 for controlling playback of media content via the media playback device 102. In some embodiments, the manual input device 160 includes one or more buttons, keys, touch levers, switches, and/or other mechanical input devices for receiving the manual input 154. For example, the manual input device 160 includes a text entry interface, such as a mechanical keyboard, a virtual keyboard, or a handwriting input device, which is configured to receive a text input, such as a text version of a user query. In addition, in some embodiments, the manual input 154 is received for managing various pieces of information transmitted via the media playback device 102 and/or controlling other functions or aspects associated with the media playback device 102.

The sound detection device 162 operates to detect and record sounds from proximate the media playback device 102. For example, the sound detection device 162 can detect sounds including the voice input 156. In some embodiments, the sound detection device 162 includes one or more acoustic sensors configured to detect sounds proximate the media playback device 102. For example, acoustic sensors of the sound detection device 162 include one or more microphones. Various types of microphones can be used for the sound detection device 162 of the media playback device 102.

In some embodiments, the voice input 156 is a user's voice (also referred to herein as an utterance) for controlling playback of media content via the media playback device 102. For example, the voice input 156 includes a voice version of the user query received from the sound detection device 162 of the media playback device 102. In addition, the voice input 156 is a user's voice for managing various data transmitted via the media playback device 102 and/or controlling other functions or aspects associated with the media playback device 102.

Media playback device 102 can detect the various actions taken in connection with the media content. For example, music playback applications include functions such as rewind, forward, pause, stop, and skip.

Referring still to FIG. 1, the display device 138 operates to display information. Examples of such information include media content playback information, notifications, and other information. In some embodiments, the display device 138 is configured as a touch sensitive display and includes the manual input device 160 of the user input device 136 for receiving the manual input 154 from a selector (e.g., a finger, stylus etc.) controlled by a user. In some embodiments, therefore, the display device 138 operates as both a display device and a user input device. The display device 138 operates to detect inputs based on one or both of touches and near-touches. In some embodiments, the display device 138 displays a graphical user interface for interacting with the media playback device 102. Other embodiments of the display device 138 do not include a touch sensitive display screen. Some embodiments include a display device and one or more separate user interface devices. Further, some embodiments do not include a display device.

The data communication device 134 operates to enable the media playback device 102 to communicate with one or more computing devices over one or more networks, such as the network 110. For example, the data communication device 134 is configured to communicate with the media delivery system 104 and receive media content from the media delivery system 104 at least partially via the network 110. The data communication device 134 can be a network interface of various types which connects the media playback device 102 to the network 110. Examples of the data communication device 134 include wired network interfaces and wireless network interfaces. Wireless network interfaces includes infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 140 operates to output media content. In some embodiments, the media content output device 140 includes one or more embedded speakers 164 which are incorporated in the media playback device 102.

Alternatively or in addition, some embodiments of the media playback device 102 include an external speaker interface 166 as an alternative output of media content. The external speaker interface 166 is configured to connect the media playback device 102 to another system having one or more speakers, such as headphones, a portal speaker, and a vehicle entertainment system, so that media output is generated via the speakers of the other system external to the media playback device 102. Examples of the external speaker interface 166 include an audio output jack, a USB port, a Bluetooth transmitter, a display panel, and a video output jack. Other embodiments are possible as well. For example, the external speaker interface 166 is configured to transmit a signal that can be used to reproduce an audio signal by a connected or paired device such as headphones or a speaker.

The processing device 148, in some embodiments, includes one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the media playback device 102. By way of example, computer-readable media includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102. In some embodiments, computer readable storage media is non-transitory computer readable storage media. The non-transitory computer-readable medium has stored thereon instructions which, when executed by one or more processors (or one or more computers), cause the one or more processors (or one or more computers) to perform the methods described herein.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, and a media playback engine 176.

Some embodiments of the memory device 150 include the media content cache 172. The media content cache 172 stores media content items, such as media content items that have been received from the media delivery system 104. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

In some examples, media content is identifiable through the use of a media content item identifier. Media content is thus retrievable for playback via the use of a media content item identifier. Other media content playback retrieval mechanisms now know or future developed can be used. Individual media content can be referred to as a media object, media content item, or multimedia object. Examples of media content include, songs, albums, music videos, podcasts, audiobooks, movies, radio stations, TV stations, TV shows, books, video games and the like. One or more media content item identifiers can be grouped together to form a media content context, such as a playlist, album, search result list, or season, among others.

The caching management engine 174 is configured to receive and cache media content in the media content cache 172 and manage the media content stored in the media content cache 172. In some embodiments, when media content is streamed from the media delivery system 104, the caching management engine 174 operates to cache at least a portion of the media content into the media content cache 172. In other embodiments, the caching management engine 174 operates to cache at least a portion of media content into the media content cache 172 while online so that the cached media content is retrieved for playback while the media playback device 102 is offline.

The media playback engine 176 operates to play media content. As described herein, the media playback engine 176 is configured to communicate with the media delivery system 104 to receive one or more media content items (e.g., through the media stream 232). In other embodiments, the media playback engine 176 is configured to play media content that is locally stored in the media playback device 102.

In some embodiments, the media playback engine 176 operates to retrieve one or more media content items that are either locally stored in the media playback device 102 or remotely stored in the media delivery system 104. In some embodiments, the media playback engine 176 is configured to send a request to the media delivery system 104 for media content items and receive information about such media content items for playback.

Referring still to FIG. 1, media delivery system 104 includes a media content server 200 and a behavior analyzer server 202. The media delivery system 104 includes one or more computing devices and provides media content to the media playback device 102 and, in some embodiments, other media playback devices as well. In addition, the media delivery system 104 interacts with the media playback device 102 to provide the media playback device 102 with various functionalities.

In at least some embodiments, the media content server 200 and the behavior analyzer server 202 are provided by separate computing devices. In other embodiments, the media content server 200 and the behavior analyzer server 202 are provided by the same computing device(s). Further, in some embodiments, at least one of the media content server 200 and the behavior analyzer server 202 is provided by multiple computing devices. For example, the media content server 200 and the behavior analyzer server 202 may be provided by multiple redundant servers located in multiple geographic locations.

Although FIG. 1 shows a single media content server 200, and a single behavior analyzer server 202, some embodiments include multiple media content servers and behavior analyzer servers. In these embodiments, each of the multiple media content servers and behavior analyzer servers may be identical or similar to the media content server 200 and the behavior analyzer server 202, respectively, as described herein, and may provide similar functionality with, for example, greater capacity and redundancy and/or services from multiple geographic locations. Alternatively, in these embodiments, some of the multiple media content servers and/or the behavior analyzer servers may perform specialized functions to provide specialized services. Various combinations thereof are possible as well.

The media content server 200 transmits stream media to media playback devices such as the media playback device 102. In some embodiments, the media content server 200 includes a media server application 212, a processing device 214, a memory device 216, and a network access device 218. The processing device 214 and the memory device 216 may be similar to the processing device 148 and the memory device 150, respectively, which have each been previously described. Therefore, the description of the processing device 214 and the memory device 216 are omitted for brevity purposes.

The network access device 218 operates to communicate with other computing devices over one or more networks, such as the network 110. Examples of the network access device include one or more wired network interfaces and wireless network interfaces. Examples of such wireless network interfaces of the network access device 218 include wireless wide area network (WWAN) interfaces (including cellular networks) and wireless local area network (WLANs) interfaces. In other examples, other types of wireless interfaces can be used for the network access device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more media streams 232A, 232B, and 232N (collectively 232).

The media application interface 224 can receive requests or other communication from media playback devices or other systems, such as the media playback device 102, to retrieve media content items 230 from the media content server 200. For example, in FIG. 2, the media application interface 224 receives communication from the media playback device 102 to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As discussed herein, the media content items 234 (including the media content items 230) may be audio, video, or any other type of media content, which may be stored in any format for storing media content.

The media content metadata 236 provides various information associated with the media content items 234. In addition or alternatively, the media content metadata 236 provides various information associated with the media contexts 238. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the media content metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 1, each of the media contexts 238 is used to identify one or more media content items 234. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device, such as the media playback device 102. The media playback device then operates to communicate with the media delivery system 104 so that the media delivery system 104 retrieves the media content items identified by the playlist 239 and transmits data for the media content items to the media playback device for playback.

At least some of the playlists 239 may include user-created playlists. For example, a user of a media streaming service provided using the media delivery system 104 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles 242 as described herein. Other information or factors can be used to determine the recommended media content items. Examples of determining recommended media content items are described in U.S. patent application Ser. No. 15/858,377, titled MEDIA CONTENT ITEM RECOMMENDATION SYSTEM, filed Dec. 29, 2017, the disclosure of which is hereby incorporated by reference in its entirety.

The user accounts 240 are used to identify users of a media streaming service provided by the media delivery system 104. In some embodiments, a user account 240 allows a user to authenticate to the media delivery system 104 and enable the user to access resources (e.g., media content items, playlists, etc.) provided by the media delivery system 104. In some embodiments, the user can use different devices to log into the user account and access data associated with the user account in the media delivery system 104. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, dates of listen by the user, songs per day, playlists, play counts, playback actions (e.g., start/stop/skip) for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 104 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Behavior Analysis System

Referring to FIG. 1, the behavior analyzer server 202 operates to determine a probability that a particular salient event (e.g., drums, singing, change in atmosphere, etc.) was the reason for an action. As described above, a playback action is an action a listener performs that effects the playback of a media content item on a media playback device.

Example actions include a skip action, a stop action, a forward action, or a reverse action. A listener may select a forward button to move past a certain segment of a song. Alternatively, a listener may select a rewind button to rewind a certain amount of time to listen to a segment of a song again. A user can also press stop to pause playback.

A skip is an action taken anytime a listener selects a control function that causes the media playback device to abandon a song before the song finishes. It could be because the listener explicitly presses a skip button on the media playback device, or it could be that they searched for and started another song before the current song finished, or they selected a different song in the playlist. For whatever reason, if the listener does not make it to the end of the song, it is referred to as a skip.

In some embodiments, the behavior analyzer server 202 includes a processing device 252, a memory device 254, a network access device 256, a graphics subsystem 258, and an output interface 260. The processing device 252, the memory device 254, and the network access device 256 may be similar to the processing device 214, the memory device 216, and the network access device 218, respectively, which have each been previously described.

Figure 2:
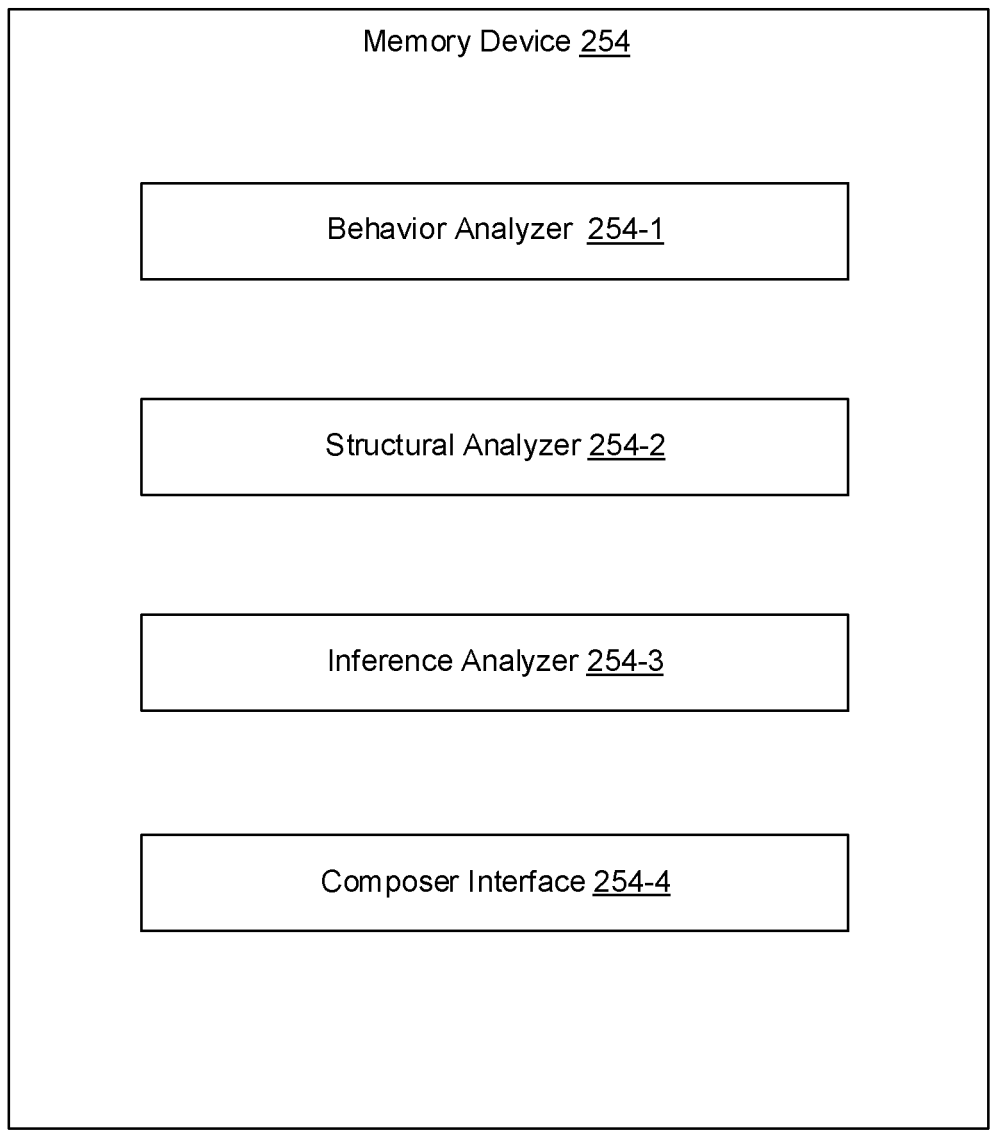
FIG. 2 illustrates example embodiments of the present invention as employed on a non-transitory computer-readable memory.

FIG. 2 illustrates some of the components stored on memory device 216 in more detail. As shown in FIG. 2, memory device 216 stores instructions which when executed by processing device 214, cause the processing device to operate as a behavior analyzer 254-1, a structural analyzer 254-2, an inference analyzer 254-3, and a composer interface subsystem 254-4.

Referring to FIGS. 1 and 2, the information generated by the behavior analyzer server 202 is provided via the graphics subsystem 258. In turn, graphics subsystem 258 can be communicatively coupled to an output interface 260. The graphics subsystem 258 receives textual and graphical information, and processes the information for output to the output interface 260.

Behavior Analyzer

Behavior analyzer 254-1 generates behavior analysis data corresponding to listener play and skip behavior. The behavior analyzer 254-1 can interact with other servers to receive information to perform play or listener behavior analysis. For example behavior analyzer 254-1 can interact with media content server 200 to retrieve data from taste profiles 242.

The behavior analyzer 254-1 can provide the behavior analysis data to graphics subsystem 258, which in turn formats the information to be presented via output interface 260.

In some embodiments, behavior analyzer 254-1 can determine a peak indicating a time at which one or more consumers of the media recording stopped listening to the media recording. The peak can correspond, for example, to a media playback device 102 receiving the action, the action being a command to skip playback of the media recording.

The peak corresponds to a media playback device 102 receiving, for example, a command to stop playback of the media recording. The peak can correspond to a media playback device 102 receiving a command to move a playback position forward or reverse to another position within the media recording. In some embodiments, the action is a skip action, a stop action, a forward action, or a reverse action.

Media playback device 102 can detect the various actions taken in connection with the media content. The action data is, in turn, communicated via data communication device 134 to media content server 200. In some embodiments, the data is stored in media data store 226 in the form of taste profiles 242. As explained above, taste profiles 242 contain records indicating media content tastes of users. In this example embodiment, each taste profile 242 contains a representation of musical activities, including user preferences and historical information about the users' consumption of media content such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc. The taste profiles 242 are, in turn, used to profile the actions of users with regard to particular media content items (e.g., songs). In some embodiments, the skip profile behavior illustrated in FIG. 2 is generated using a collection of user skip activity with respect to a particular song from a plurality of users.

Oftentimes, a particular song (i.e., referred to sometimes as the canonical song or canonical media content item) is recorded several ways, such that each version is distinctly different. Accordingly, in some embodiments, activity data for the same version of a song is analyzed.

Figure 4:
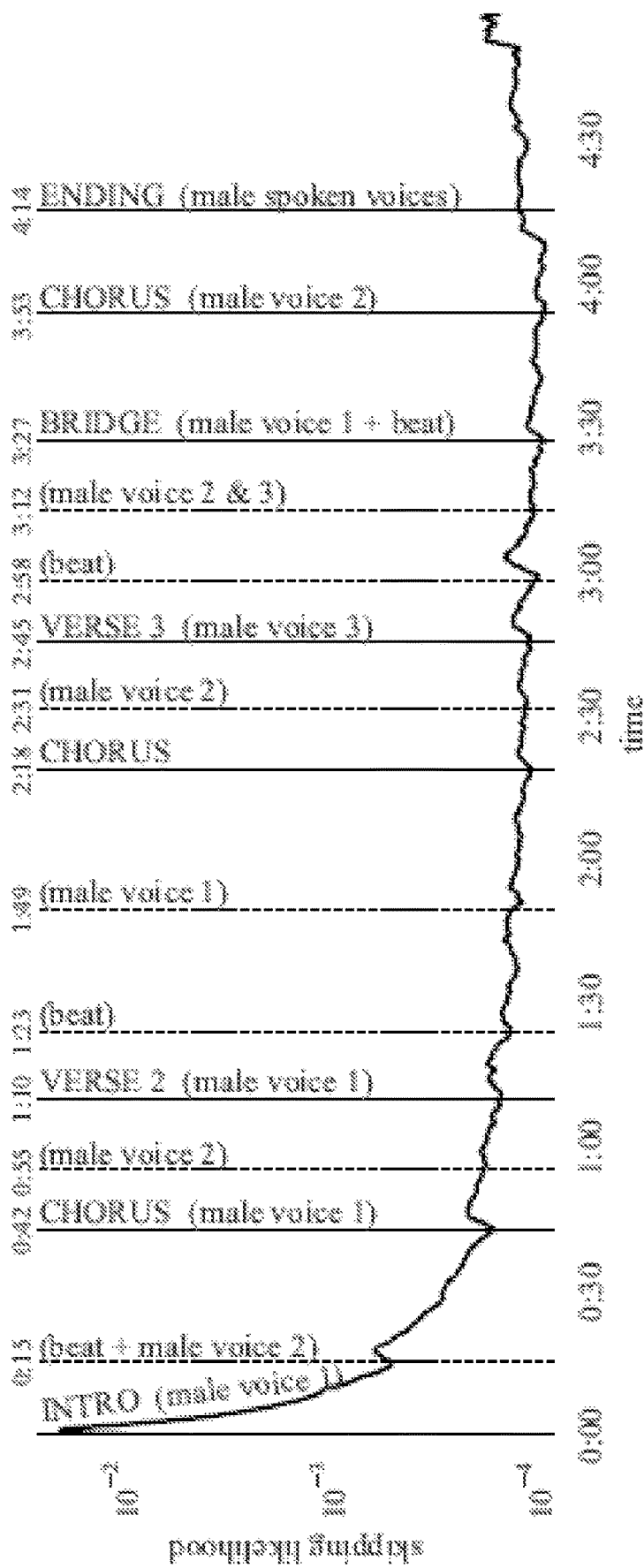
FIG. 4 illustrates a listener behavior profile for a particular song according to an example embodiment.

FIG. 4 illustrates a listener behavior profile for a particular song according to an example embodiment of the present invention. In this example, the listener behavior profile is overlayed with musical structure boundaries and the listener behavior is collected as a probability distribution of time. The probability distribution particularly provides the probabilities of occurrence of a particular action (e.g., a skip action, a stop action, a forward action, or a reverse action) over the time span of a song. For example, the probability distribution can describes a random phenomenon in terms of the probabilities of a skip. The probability distribution is defined in terms of an underlying sample space, which is the set of all possible skip actions, which are viewed as the random phenomenon being observed over the playback time of a song. As can be deduced from FIG. 4, dense areas of skips occur at approximately 0:00-0:15 seconds (i.e., the introduction of the song being a first male voice); 0:15-0:42 seconds (a beat and a second male voice); 0:42-0:55 seconds (a chorus and the first male voice); and 2:58-3:12 seconds (a beat).

Figure 5:
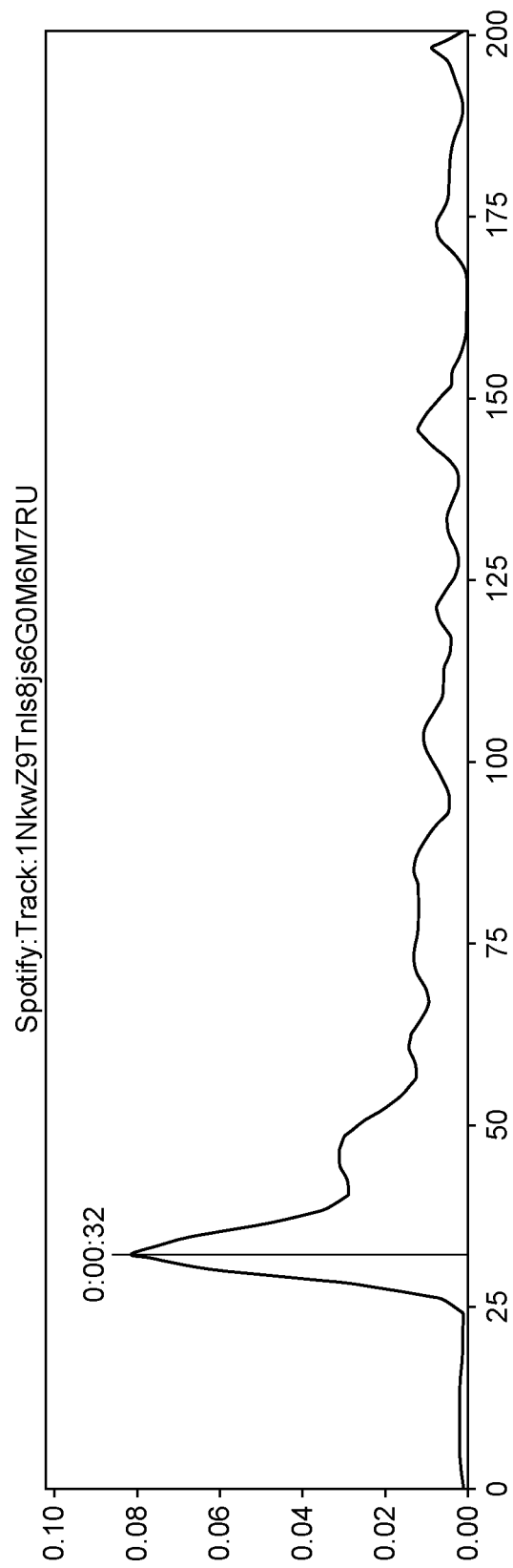
FIG. 5 illustrates an example distribution for a particular track according to an example embodiment.

It should also be understood that different techniques for extracting signals (e.g., probabilities) from listener interactions during listening (e.g., skips) can be used. In another example embodiment, skips can be filtered based on some contextual logic, e.g. collect skips where the preceding and following tracks were not skipped, restricted to album contexts. In turn, track-wise skip distributions that are scaled by the average occurrence of skips over all tracks are created. FIG. 5 illustrates an example distribution for a particular track according to this embodiment. As can be deduced from this example, the dense area of skips occurs at approximately 32 seconds. If for example, at this time falsetto vocals are starting, there is a high probability that the reason for the skips is a result of this type of activity, namely voice activity.

In some embodiments, time can be represented as a percentage of the track rather than absolute time so that tracks of different lengths can be normalized.

Structural Analyzer

A media content item, particularly a music piece such as a song, can be 4described as a sequence of sound events played by one or several sound sources, instrument, vocals, and the like. One aspect of the present invention obtains the music structure descriptions of the media content item being analyzed, referred to herein as music structure description data.

Music structure description data can be obtained from a remote structural analyzer (not shown) via, for example, network access device 218. Alternatively, the music structure description data can be obtained from a structural analyzer 254-2 component of behavior analyzer server 202. Alternatively, the music structure description data can be obtained from both a remote structural analyzer (not shown) and a structural analyzer 254-2. The notion of a structure within a media content item can be defined in different ways. It would be advantageous therefore to obtain music structure descriptions from several sources so as to obtain multiple music structure descriptions, some of which might describe the structural segments differently. Accordingly, in some embodiments, distinct music structure descriptions for a particular media content item are obtained from plural sources. This allows, for example, a composer to have a more robust view of the media content. For example, different music structure descriptions may provide different interpretations of the acoustic properties of, for example, instruments playing or singers singing. Similarly, the function of these acoustic properties may be interpreted to have different functions within the media content item (e.g., introduction, chorus, verse, bridge, theme, variation, coda, etc.). Other differences may be found using different sources of music structure descriptions.

In some embodiments, music structure description data are provided by structural analyzer 254-2. Structural analyzer 254-2 determines the overall structure of a media content item (e.g., a piece of audio) and provides the music structure description data representing the organization of the media content item. Such music structure is sometimes referred to as musical form. Therefore music structure description data can also be interchangeably called music form description data. In one embodiment, this is accomplished by collecting editorial information. In some embodiments, music structure description data can be obtained automatically using now known or future known structure analysis techniques for performing music information retrieval such as by performing music structure segmentation using convolutional neural networks, self-similarity matrix evaluation, unsupervised non-negative matrix factorization, and the like.

In an example embodiment, annotations are produced manually by, for example, annotators who annotate music structure into elementary units called semiotic blocks, reflecting high-level and high-scale similarities across the music piece. The annotation process requires both the localization of block boundaries (segmentation) and the determination of block classes (labeling) by combining elements resulting from the analysis of internal properties forming systems within blocks (morphological analysis), from the characterization of distinctive properties across blocks (paradigmatic analysis) and from the location and context of blocks within the music piece (syntagmatic analysis). The implementation of these principles can be used to generate a set of notations.

In another example embodiment, annotations of the music structure are produced automatically by, for example, performing a feature extraction step that transforms an audio signal of a music piece into a sequence of feature vectors $X=\{x_t\}_{t \leq t \leq T}$ modeling some acoustical properties over time. In turn, a structural analysis step is performed to produce a description of the structure of the piece by means of a sequence of consecutive segments $S=\{s_k\}_{1 \leq k \leq K}$ covering the whole piece. The type of structure implies the choice of musical dimensions to analyze, the way a structural segment is characterized (segment detection criteria) and the additional constraints used to converge towards a single macroscopic structure (structural constraints).

Inference Engine

In an example embodiment, the behavior analysis data generated by behavior analyzer 254-1 is combined with the music structure description data generated by structure analyzer 254-2 by an inference analyzer 254-3. The combined data provides information related to the salient events of a song. In some embodiments, the inference analyzer 254-3 generates a mapping of at least one salient event of a media recording to a corresponding probability value indicating a probability that the at least one salient event is a cause for an action associated with the media recording.

In some embodiments, action behavior is predicted from the audio signals of the media content item and its music structure description data to generate an action prediction profile. An action prediction profile represents prediction action behavior for a particular media content item (e.g., a song). For example, a recurrent neural network (RNN) can be trained on a database of songs with representations of historical musical activities associated with each song (e.g., as contained in taste profiles).

Once trained, the RNN can be used to generate an action prediction profile. An input media content item is fed to the trained RNN and an action prediction profile is output (e.g., data indicating when skips are predicted to occur). Action prediction profiles can be stored in a data store.

In an example implementation, during the composition process of a music piece, the structure analyzer 254-1 updates the music structure description data associated with the music piece. In an example embodiment, given a new instance of the music piece, the trained RNN (i.e., trained model) returns an updated action predicted profile. In an example embodiment, the action prediction profile is in the form of an ordered series of name-value pairs, where the name is the type of action and the value is the probability that the action will occur. The name value pairs are also associated with a time relative to the musical piece. In an example embodiment, the probability is represented as a value between 0 and 1.

Music structure description data for an updated music piece is, in turn, fed to the RNN network to generate an updated action prediction profile for the music piece in progress. The action prediction profile can be displayed through a graphical user interface via display 138.

In some embodiments, various musical items are provided as options for the user to insert into the musical piece being composed. A user can select a replacement option. The replacement option is used to replace a portion of the musical piece. Upon generating satisfactory action prediction profile, the process can end.

In some embodiments, a determination of whether the action prediction profile is satisfactory is performed manually by a visual review via the graphical user interface. In other embodiments, the options can be selected and inserted automatically by comparing the action predication profile to a threshold profile until a predetermined threshold is met. Various options can be systematically or randomly selected until the threshold is met.

Graphics Subsystem

The mapping data generated by the inference analyzer 254-3 is, in turn, fed to graphics subsystem 258 which renders a graphical user interface that presents the mapped data. For example, the information can be displayed on a display screen as a time-axis plot indicating a time of an occurrence of the salient event(s).

The listener behavior probability estimates are correlated with the musical attributes of the song. In some embodiments, the inference analyzer 254-3 maps peaks in the listener behavior to salient events of the music structure of the song. In some embodiments, the inference analyzer 254-3 assigns the closest salient events in the structure analysis of the song occurring before the peak in the skip distribution. In some embodiments, the inference analyzer 254-3 builds a trade-off function taking into account both 1) the temporal interval between the salient event and the peak and 2) the salience of the event.

In some embodiments, the inference analyzer 254-3 builds a model of the song as a sequence of specific actions (e.g., add drum track, add saxophone sound, add minor chord, etc.).

Figure 6:
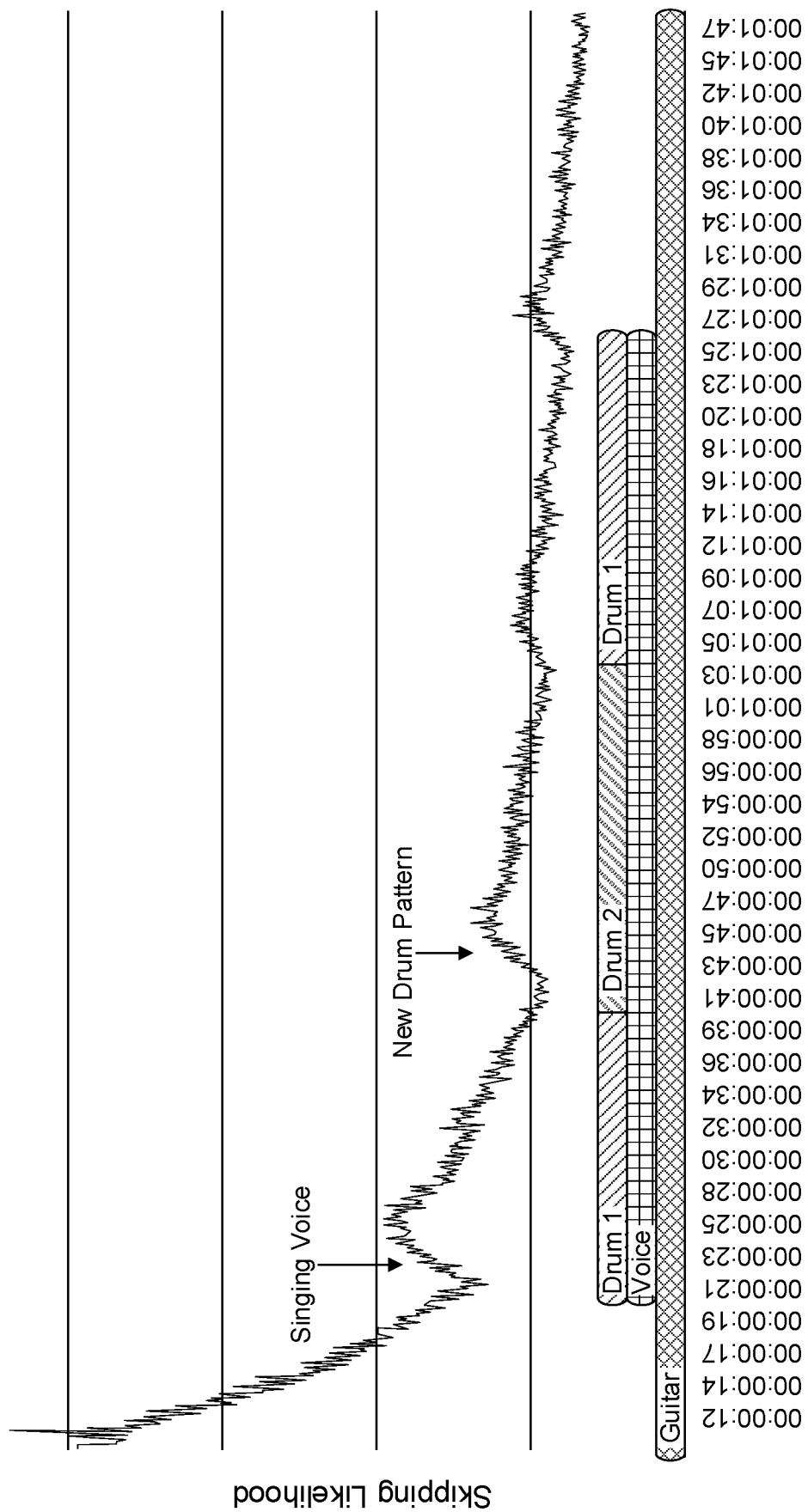
FIG. 6 illustrates a listener behavior profile for a particular song and the structure of the song.

FIG. 6 illustrates a listener behavior profile for a particular song combined with the structural analysis that may be provided by the structural analyzer 254-2. FIG. 6 shows peaks of skip behavior at the beginning of the song, when only the guitar is playing, shortly after the introduction of drums and voice (25 second), shortly after each of two changes in the drum pattern (45 seconds and 1 minute, 7 seconds), and after the end of voice and drums, with only the guitar playing (1 minute, 28 seconds). A display similar to FIG. 6 may be generated by the graphics subsystem 258.

The behavior analyzer server 202 provides an improved interface by allowing a user to more quickly access desired analysis data. Such information was not previously available. The graphics subsystem displays a limited list of salient events and related information directly from a single display. Such a mechanism allows for far faster easier analysis and presentation of playback data than conventional approaches particularly.

In some embodiments, the consumption behavior of the media content, in this case a song, by an audience is based on the actions they have taken while listening to the content (e.g., skip, stop, forward, rewind). This information is recorded and made available in digital form in the form.

Composer Interface Subsystem

Figure 3:
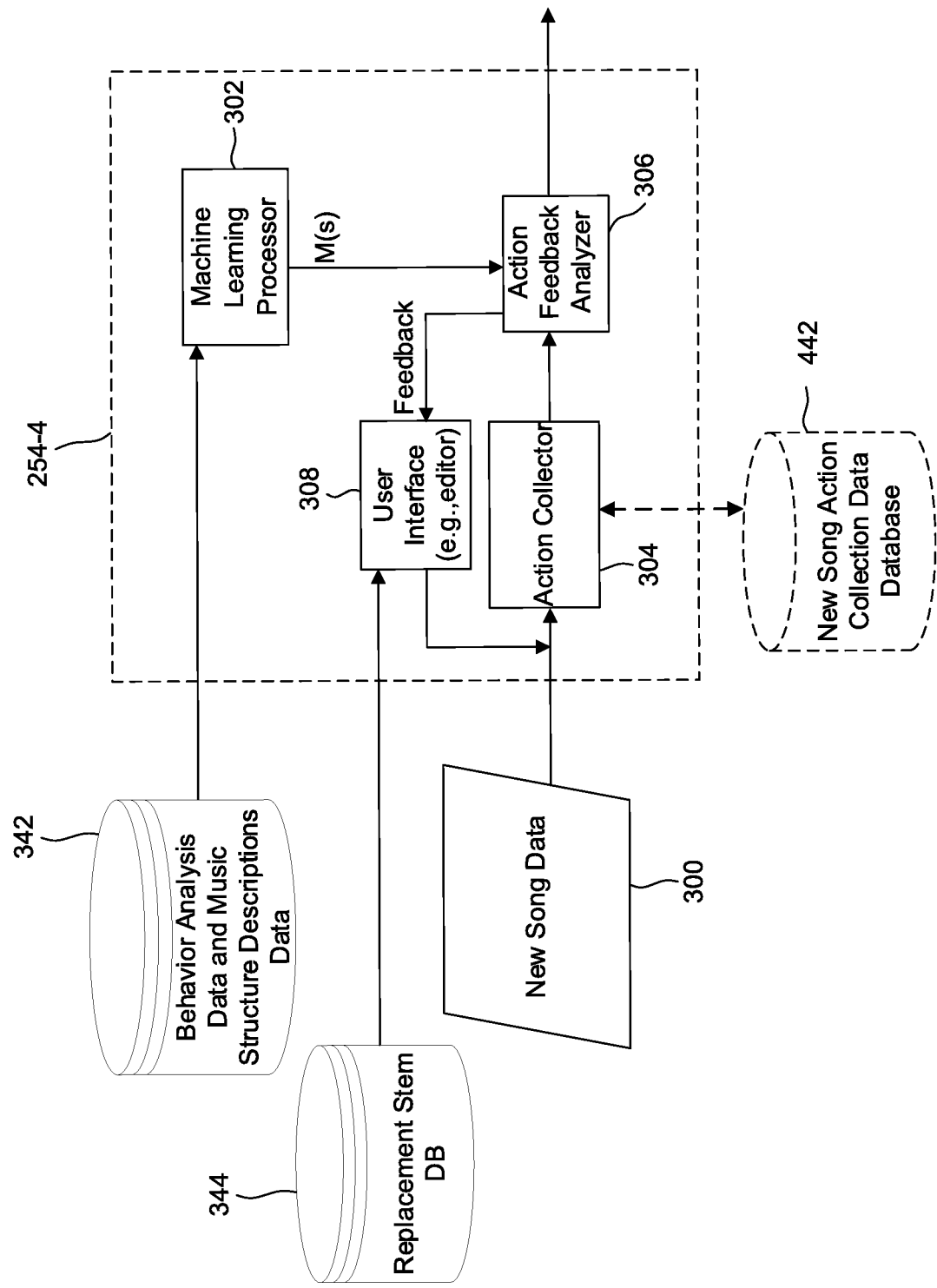
FIG. 3 illustrates an example composer interface subsystem according to an example embodiment of the present invention.

In some embodiments, a composer interface subsystem 254-4 is provided. Composer interface subsystem 254-4 can take the form of a hardware implementation, an entirely software implementation, or an implementation combining software and hardware aspects. FIG. 3 illustrates a more detailed example composer interface subsystem 254-4, according to an example embodiment of the present invention.

In at least some embodiments, the media content server 200, the behavior analyzer server 202 and the composer interface subsystem 254-4 are provided by separate computing devices. In other embodiments, the media content server 200, the behavior analyzer server 202, and composer interface subsystem 254-4 are provided by the same computing device(s). Further, in some embodiments, at least one of the media content server 200, the behavior analyzer server 202, and composer interface subsystem 254-4 is provided by multiple computing devices. For example, the media content server 200, the behavior analyzer server 202 and composer interface subsystem 254-4 may be provided by multiple redundant servers located in multiple geographic locations.

In an example implementation composer interface subsystem 254-4 includes a machine learning processor 302, an action collector 304, an action feedback analyzer 306, and a user interface 308. In some embodiments, user interface 308 is a music editor which can be integrated to be presented via graphics subsystem 258 and output interface 260 described above in connection with FIG. 1.

In some embodiments, machine learning processor 302 is trained on a corpus of the behavior analysis data and the music structure description data for plural media content items (e.g., songs). Machine learning processor 302 trains a model M(s) based on the music structure description data for the plural media content items. A new instance of song data including music structure description data can be input into composer interface subsystem 254-4 to test the music structure description of the new song.

In an example embodiment, a q-learning model can be built based on the behavior analysis data generated by behavior analyzer 254-1 and music structure data generated by structural analyzer 254-2 as represented by database 342. Database 342 stores the behavior analysis data generated by behavior analyzer 254-1 and music structure data generated by structural analyzer 254-2.

When a new song is created and proposed to an audience, its action (e.g., skip behavior) can be collected and stored in new song action collection data database 442.

In some embodiments, a reward (as defined in reinforcement learning) is defined by the integral in time of the number of listeners who have not skipped at time t. In some embodiments, the observed skip behavior for the new song can be explained by the model, in which case a different action is possibly proposed. In one example use case, the observed skip behavior for the new song can be explained by the model M(s), in which case an action that will provide for more favorable behavior feedback can be proposed. In an example implementation, a given audio segment can be replaced with another style, spectral feature (e.g., melody, pitch, harmony, timbre, chroma, loudness, vocalness), instrument, etc. by generating a replacement stem (with the same harmony, rhythm, melody, etc.) using various generation tools such as concatenative synthesis, deep learning audio generation, and the like. A number of various replacement stems can be prestored in a stem database 344. In example embodiment, the stem that produces an action prediction profile that meets a predetermined threshold (e.g., a predetermined skip profile) is selected.

In some embodiments, the observed skip behavior contradicts the model M(s). In such a case, the model is updated and a notification is generated to the creator, stressing the action as a surprisingly "good" or "bad" action (with respect to the current model). At a relatively large-scale, a very good (and extensible) model of song creation is obtained.

In some embodiments, a computing device is provided comprising a display screen. The computing device is configured to decompose a media recording into plural media recording salient events. The computing device can also apply each of the media recording salient events to a reinforcement model. The computing device can also display on the display screen (i) a mapping of the plurality of media recording salient events and (ii) for at least one of the plurality of media recording salient events, at least one selectable next best action.

In an example embodiment, the computing device can replace at least one of the media recording salient events with at least one selectable next best action to create a derivative media recording including at least one replacement media recording action. In one example, the selectable next best action is at least one media recording salient event having a probability of causing an action to occur that is below a threshold.

In some embodiments, the computing device displays on the display screen phases of the media recording, where each phase includes at least one of the media recording salient events.

In some embodiments, the computing device determines, for each of the plurality of media recording salient events, a probability value indicating a probability that the media recording salient event is a cause for a playback action, and swap the at least one selectable next best action for the media recording salient event automatically.

In some embodiments, the playback action is at least one of a skip action, a stop action, a forward action, and a reverse action.

In other embodiments, the computing device determines, for each of the plurality of media recording salient events, a probability value indicating a probability that the media recording salient event is a cause for a playback action and swap the at least one selectable next best action for the media recording salient event automatically until the probability value is within a predetermined threshold.

In some embodiments, a media playback component is provided. The computing device causes the media playback component to playback the derivative media recording a predetermined time prior to the media recording salient event and to playback the media recording salient event and the at least one selectable next best action sequentially starting from the predetermined time.

In yet other embodiments, a media playback component is provided. The computing device provides a visual indication of the at least one replacement action, the at least one replacement action being selectable. When a replacement action is selected, the media playback component plays back the derivative media recording from a predetermined time prior to a start of the replacement action, including the replacement media recording.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-6 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A computing device comprising a display screen, the computing device being configured to:
   decompose a media recording into a plurality of media recording salient events,
   apply each of the media recording salient events to a reinforcement model,
   determine for each of the plurality of media recording salient events a probability value indicating a probability that the media recording salient event is a cause for a playback action, and
   display on the display screen;
      (i) a mapping of the plurality of media recording salient events and
      (ii) for at least one of the plurality of media recording salient events, at least one selectable next best action,
   the computing device further configured to:
      create a derivative media recording available for playback by replacing at least one of the plurality of media recording salient events with at least one selectable next best action having a probability value indicating the probability of causing an action to occur is within a predetermined threshold, the at least one selectable next best action including at least one replacement media recording salient event.

2. The computing device according to claim 1 further configured to display on the display screen a plurality of phases of the media recording, each phase including at least one of the media recording salient events.

3. The computing device according to claim 1 further configured to replace the at least one selectable next best action for the media recording salient event automatically.

4. The computing device of claim 3, wherein:
   the playback action is at least one of a skip action, a stop action, a forward action, and a reverse action, and
   the action is at least one of a skip action, a stop action, a forward action, and a reverse action.

5. The computing device according to claim 1 further configured to replace the at least one selectable next best action for the media recording salient event automatically until the probability value is within the predetermined threshold.

6. The computing device according to claim 5, further comprising:
a media playback component, the computing device further configured to cause the media playback component to playback the derivative media recording a predetermined time prior to the media recording salient event and to playback the media recording salient event and the at least one selectable next best action sequentially starting from the predetermined time.

7. The computing device according to claim 5, further comprising:
a media playback component, the computing device further configured to provide a visual indication of the at least one replacement action, the at least one replacement action being selectable, wherein when the at least one replacement action is selected, the media playback component plays back the derivative media recording from a predetermined time prior to a start of the replacement action.

8. The computing device according to claim 1, wherein the action is the playback action and the at least one replacement media recording salient event has a probability of causing the action to occur that is below a threshold.

9. The computing device according to claim 1, the computing device further configured to:
create the derivative media recording available for playback by replacing at least one of the plurality of media recording salient events with at least one selectable next best action including an event that is not a media recording salient event.

10. A computer-implemented method, comprising:
decomposing a media recording into a plurality of media recording salient events;
applying each of the media recording salient events to a reinforcement model;
determining for each of the plurality of media recording salient events a probability value indicating a probability that the media recording salient event is a cause for a playback action;
displaying on a display screen:
(i) a mapping of the plurality of media recording salient events, and
(ii) for at least one of the plurality of media recording salient events, at least one selectable next best action; and
creating a derivative media recording available for playback by replacing at least one of the plurality of media recording salient events with at least one selectable next best action having a probability value indicating the probability of causing an action to occur is within a predetermined threshold, the at least one selectable next best action including at least one replacement media recording salient event.

11. The computer-implemented method according to claim 10, further comprising:
displaying on the display screen a plurality of phases of the media recording, each phase including at least one of the media recording salient events.

12. The computer-implemented method according to claim 10, further comprising:
replacing the at least one selectable next best action for the media recording salient event automatically.

13. The computer-implemented method according to claim 12, wherein:
the playback action is at least one of a skip action, a stop action, a forward action, and a reverse action, and
the action is at least one of a skip action, a stop action, a forward action, and a reverse action.

14. The computer-implemented method according to claim 10, further comprising:
replacing the at least one selectable next best action for the media recording salient event automatically until the probability value is within the predetermined threshold.

15. The computer-implemented method according to claim 14, further comprising:
causing a media playback component to playback the derivative media recording a predetermined time prior to the media recording salient event and to playback the media recording salient event and the at least one selectable next best action sequentially starting from the predetermined time.

16. The computer-implemented method according to claim 14, further comprising:
causing a media playback component to provide a visual indication of the at least one replacement action, the at least one replacement action being selectable, wherein when the at least one replacement action is selected, the media playback component plays back the derivative media recording from a predetermined time prior to a start of the replacement action.

17. The computer-implemented method according to claim 10, wherein the action is the playback action and the at least one replacement media recording salient event has a probability of causing the action to occur that is below a threshold.

18. The computer-implemented method according to claim 10, further comprising:
creating the derivative media recording available for playback by replacing at least one of the plurality of media recording salient events with at least one selectable next best action including an event that is not a media recording salient event.

19. A non-transitory computer-readable medium having stored thereon instructions which, when executed by one or more processors, cause the one or more processors to perform:
decomposing a media recording into a plurality of media recording salient events;
applying each of the media recording salient events to a reinforcement model;
determine for each of the plurality of media recording salient events a probability value indicating a probability that the media recording salient event is a cause for a playback action;
displaying on a display screen:
(i) a mapping of the plurality of media recording salient events, and
(ii) for at least one of the plurality of media recording salient events, at least one selectable next best action; and
creating a derivative media recording available for playback by replacing at least one of the plurality of media recording salient events with at least one selectable next best action having a probability value indicating the probability of causing an action to occur is within a predetermined threshold, the at least one selectable next best action including at least one replacement media recording salient event.

20. The non-transitory computer-readable medium of claim 19, further having stored thereon a sequence of instructions for causing the one or more processors to perform:
displaying on the display screen a plurality of phases of the media recording, each phase including at least one of the media recording salient events.

21. The non-transitory computer-readable medium of claim 19, further having stored thereon a sequence of instructions for causing the one or more processors to perform:
replacing the at least one selectable next best action for the media recording salient event automatically.

22. The non-transitory computer-readable medium of claim 21, wherein;
the playback action is at least one of a skip action, a stop action, a forward action, and a reverse action, and
the action is at least one of a skip action, a stop action, a forward action, and a reverse action.

23. The non-transitory computer-readable medium of claim 19, further having stored thereon a sequence of instructions for causing the one or more processors to perform:
replacing the at least one selectable next best action for the media recording salient event automatically until the probability value is within the predetermined threshold.

24. The non-transitory computer-readable medium of claim 23, further having stored thereon a sequence of instructions for causing the one or more processors to perform:
causing a media playback component to playback the derivative media recording a predetermined time prior to the media recording salient event and to playback the media recording salient event and the at least one selectable next best action sequentially starting from the predetermined time.

25. The non-transitory computer-readable medium of claim 23, further having stored thereon a sequence of instructions for causing the one or more processors to perform:
causing a media playback component to provide a visual indication of the at least one replacement action, the at least one replacement action being selectable, wherein when the at least one replacement action is selected, the media playback component plays back the derivative media recording from a predetermined time prior to a start of the replacement action.

26. The non-transitory computer-readable medium of claim 19, wherein the action is the playback action and the at least one replacement media recording salient event has a probability of causing the action to occur that is below a threshold.

27. The non-transitory computer-readable medium of claim 19, further having stored thereon a sequence of instructions for causing the one or more processors to perform:
creating the derivative media recording available for playback by replacing at least one of the plurality of media recording salient events with at least one selectable next best action including an event that is not a media recording salient event.

* * * * *